US012162089B2

(12) United States Patent
Lee et al.

(10) Patent No.: US 12,162,089 B2
(45) Date of Patent: Dec. 10, 2024

(54) MANUAL UNIVERSAL PUNCHING/WELDING APPARATUS AND METHOD

(71) Applicants: HYUNDAI MOBIS Co., Ltd., Seoul (KR); AUBURN UNIVERSITY, Auburn, AL (US)

(72) Inventors: Woo Won Lee, Montgomery, AL (US); Jackson Reeves, Montgomery, AL (US)

(73) Assignees: HYUNDAI MOBIS CO., LTD., Seoul (KR); AUBURN UNIVERSITY, Auburn, AL (US)

( * ) Notice: Subject to any disclaimer, the term of this patent is extended or adjusted under 35 U.S.C. 154(b) by 68 days.

(21) Appl. No.: 17/365,452

(22) Filed: Jul. 1, 2021

(65) Prior Publication Data

US 2023/0001505 A1    Jan. 5, 2023

(51) Int. Cl.
    *B23K 20/26* (2006.01)
    *B23K 20/10* (2006.01)
    *B23K 37/04* (2006.01)

(52) U.S. Cl.
    CPC .............. *B23K 20/26* (2013.01); *B23K 20/10* (2013.01)

(58) Field of Classification Search
    None
    See application file for complete search history.

(56) References Cited

U.S. PATENT DOCUMENTS

| 7,469,455 | B2 * | 12/2008 | Distel | B29C 66/301 |
|   |   |   |   | 29/34 R |
| 9,656,404 | B2 * | 5/2017 | Tresse | B26F 1/02 |
| 2005/0223549 | A1 * | 10/2005 | Braun | B29C 66/8242 |
|   |   |   |   | 29/799 |
| 2005/0263520 | A1 * | 12/2005 | Szucher | B29C 66/43 |
|   |   |   |   | 219/603 |
| 2017/0312805 | A1 * | 11/2017 | Kim | B29C 66/8322 |

FOREIGN PATENT DOCUMENTS

| CN | 205817106 | U | * | 12/2016 |   |
| CN | 110625947 | A | * | 12/2019 |   |
| CN | 211682483 | U | * | 10/2020 | ............. B21D 28/24 |
| CN | 111993061 | A | * | 11/2020 |   |
| RU | 2563071 | C2 | * | 9/2015 | ............... B26F 1/02 |
| WO | WO-2017034566 | A1 | * | 3/2017 | ............. B21D 28/24 |

* cited by examiner

*Primary Examiner* — Devang R Patel
(74) *Attorney, Agent, or Firm* — NSIP Law

(57) ABSTRACT

A manual universal punching and welding apparatus includes a body frame having at least a vertical wall; a pair of supporting arms that are attached to the body frame and clamp a portion of the work object; a punching head that rotates clockwise and counterclockwise in a plane defined by the vertical wall of the body frame; and a welding part for welding the work object loaded on the work object loading part of the punching head. As for an efficiency of the present invention, a single manual punching/welding apparatus may produce all types of parts that require punching and welding. In addition, compared to the maintenance of a large number of designated machines, only one universal machine would desire maintenance, which greatly reduces the burden of overall maintenance.

15 Claims, 5 Drawing Sheets

MANUAL UNIVERSAL PUNCHING/WELDING APPARATUS AND METHOD

BACKGROUND

Field

Exemplary embodiments relate to manual universal punching/welding apparatus and method used for the production of parts for automobiles requiring punching and welding.

Discussion of the Background

When manufacturing parts of automobiles, significant work of piercing a hole (punching) and welding is required. In particular, the bumpers of advanced automobiles are equipped with backup warning sensors (BWS). To install these sensors on the bumper, the bumper is perforated by punching and the brackets or holders are welded thereto. According to a quality standard, ultrasonic techniques must be used in punching and welding processes.

Conventionally, an ultrasonic punching/welding apparatus designated for each type of bumper is used for the process. However, with punching/welding machines designated for each type of bumper as above, only one vehicle bumper model can be produced for each machine. Each bumper model has a different shape and size for each vehicle. That is, the size of hole and the punching angle vary depending on the bumper model. Therefore, each machine designated for each bumper model is available only for a limited period of time, and once a mass production is completed, the machine is not used frequently but occasionally, thus occupying much space in the factory.

The above information disclosed in this Background section is only for enhancement of understanding of the background of the invention and, therefore, it may contain information that does not constitute prior art.

SUMMARY

Exemplary embodiments of the present invention include production of parts for after-service following the mass production (bumpers, as well as other parts that have to be punched and welded) or production of regular parts during mass production. By replacing various manual punching/welding machines designated for each of various types of parts with one (1) universal manual punching/welding machine, space efficiency may be increased and costs reduced.

Additional features of the invention will be set forth in the description which follows, and in part will be apparent from the description, or may be learned by practice of the invention.

According to one aspect of the present invention, there is provided a manual universal punching and welding apparatus including a body frame having at least a vertical wall; a pair of supporting arms that may be attached to the body frame and clamping a portion of the work object, wherein each supporting arm may include a plurality of joints for rotating the clamped work object in different directions, and a vertical moving part for raising and lowering the clamped work object; a punching head that may rotate clockwise and counterclockwise in a plane defined by the vertical wall of the body frame, including a work object loading part, that may support and load the work object together with one of the pair of supporting arms, and a punching part that may punch the loaded work object; and a welding part for welding the work object loaded on the work object loading part of the punching head.

According to another aspect of the present invention, for punching and welding by supporting the work object, there is provided a manual universal punching and welding method including clamping a portion of a work object with a supporting arm that may rotate in different directions by a plurality of joints and be raised and lowered by a vertical moving part; by supporting and loading a portion different from the clamped portion of the work object with a loading part of a punching head rotating the loaded work object clockwise and counterclockwise on a vertical plane; and welding the work object loaded on the work object loading part of the punching head.

The configuration and operation of the present invention may become more apparent through specific embodiments described below together with the drawings.

As for an efficiency of the present invention, a single manual punching/welding to apparatus (occupying an area of about 282 ft$^2$) may produce all types of parts that use punching and welding. If twenty-two (22) manual punching/welding apparatuses (occupying an area of about 7,520 ft$^2$) were designated for each type of part and used, the occupied area would increase by 96.25% compared to that of the universal machine of the present invention.

In addition, compared to the maintenance of a large number of designated machines, only one universal machine would desire maintenance, which greatly reduces the burden of overall maintenance.

With the universal punching/welding apparatus and method according to the present invention, only one worker is used for operation due to its structure.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
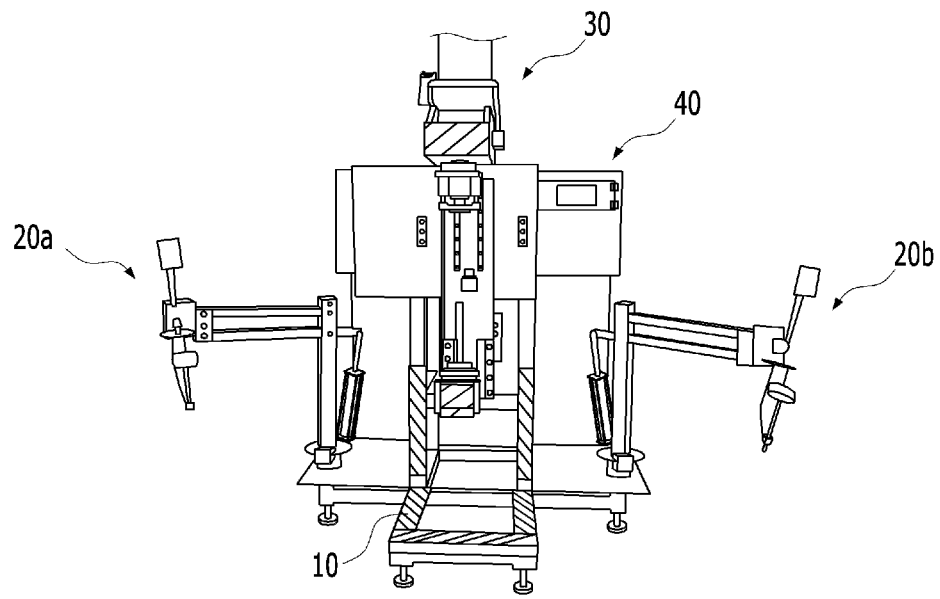
FIG. 1 illustrates an overall view of a manual universal punching/welding apparatus according to an embodiment of the present invention.

The invention is described more fully hereinafter with reference to the accompanying drawings, in which embodiments of the invention are illustrated. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. Unless particularly described to the contrary, the term "comprise", "configure", "have", or the like, which are described herein, will be understood to imply the inclusion of the stated components, and therefore should be construed as including other components, and not the exclusion of any other elements.

Directional terms such as transverse, horizontal, vertical, etc, are used to describe one part in relation to another or to the system as a whole. Such terms are not meant to be limiting regarding any fixed direction or orientation in which the apparatus may be used. If the apparatus is mounted on a foundation with a different orientation than is illustrated, the directional qualities of the apparatus will shift accordingly.

Also, terms such as front, back, upper, lower, first, second, and so on, are usually meant to aid the reader in identifying different parts but are not meant to limit the structure in any way. Often the terms may be interchangeable and use of the terms is not meant to limit the structure of a part, unless indicated otherwise in the specification and drawings.

The advantages and features of the present invention, and the manner of achieving them, will become apparent with reference to the preferred embodiments described in detail together with the accompanying drawings. However, the present invention is not limited to the embodiments described below but may be implemented in various other forms. The embodiments are merely provided to disclose the present invention and to fully inform those of ordinary skill in the art to which the present invention pertains, and the present invention is defined by the contents of the claims. In addition, the terminology used herein is for explaining embodiments and are not intended to limit the present invention. Herein, the singular form also includes the plural forms unless otherwise noted. It is also to be understood that the term "comprise(s)," "comprising," or the like as used herein is used in a sense that does not exclude the presence or addition of one or more other components, steps, operations, and/or elements other than the mentioned components, steps, operations, and/or elements.

Hereinafter, preferred embodiments of the present invention will be described in detail with reference to the accompanying drawings. In the description of the embodiments, when a detailed description of a related known configuration or function may obscure the subject matter of the present invention, the detailed description will be omitted.

FIG. 1 illustrates an overall view of a manual universal punching/welding apparatus according to an embodiment of the present invention. This embodiment deals with a case where the object to be punched/welded is an automobile bumper, but embodiments are not limited thereto. The punching/welding apparatus may be used for other types of automobile body parts or other parts as may be determined by one skilled in the art. Embodiments described herein may allow those skilled in the art to understand the spirit of the present invention.

The manual universal punching/welding apparatus according to embodiments of the present invention includes a body frame 10; a pair of supporting arms 20a, 20b located on both sides of the body frame 10 configured to support a portion of a bumper; a punching head 30 located at substantially a central portion of the body frame 10 configured to punch at a punching position of the bumper; and a welding part 40 for ultrasonic welding to a bracket configured to mount a sensor and the like.

Figure 2:
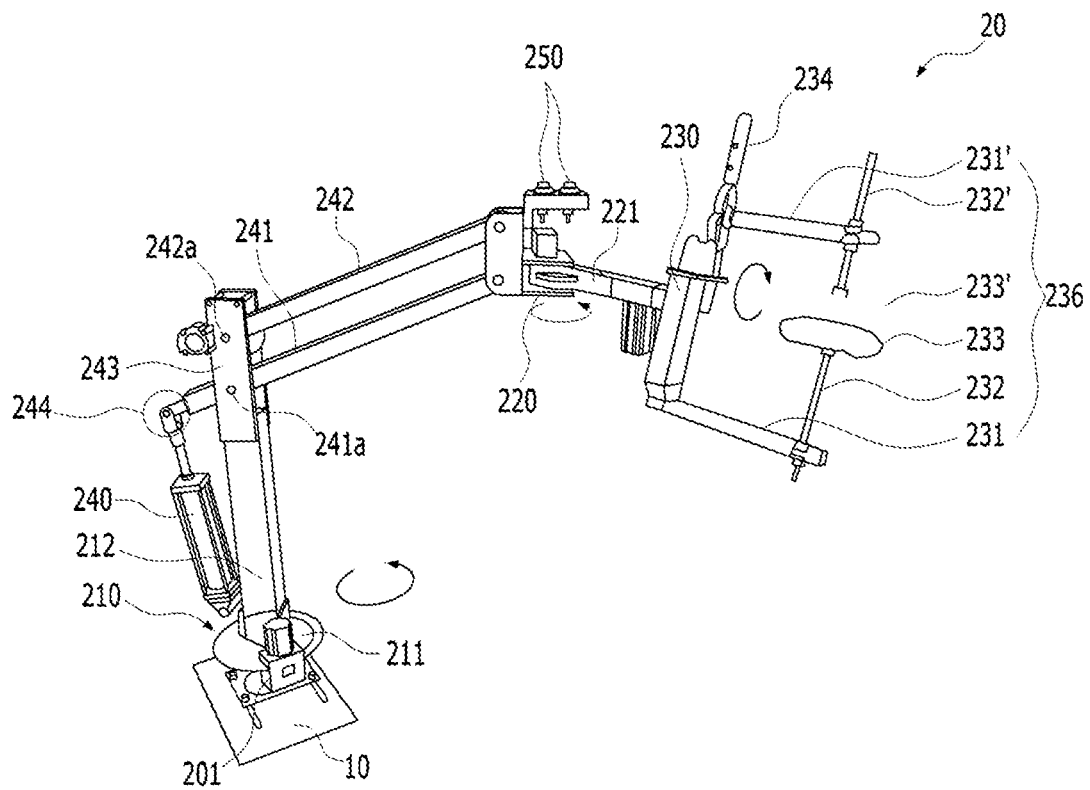
FIG. 2 illustrates a detailed configuration diagram of the supporting arm.

FIG. 2 is a detailed configuration diagram of a supporting arm 20. As illustrated in FIG. 1, the pair of supporting arms 20a and 20b are provided on both sides of the body frame 10 to support each end of the bumper to be machined.

Each supporting arm 20a or 20b embodied in supporting arm 20 has three rotatable joints so that free positioning and fixing with three rotatable joints is possible. Each rotatable joint may be fixed in position by a brake system using one or more air cylinder(s). Degrees of freedom are improved by the rotation of the three joints in different directions, and these high degrees of freedom of the supporting arm makes it sufficient to fix and move the bumper with only one person (worker).

The three rotatable joints include a base rotatable part 210, a clamp arm rotatable part 220, and a clamp rotatable part 230. In FIG. 2, the base rotatable part 210 is configured to horizontally rotate the entire structure of the supporting arms 20a and 20b; the clamp arm rotatable part 220 is configured to horizontally rotate the clamp arm (described below); and the clamp rotatable part 230 is configured to vertically rotate the clamping assembly (described below) configured to hold the bumper.

Horizontal, vertical, and other rotation terms are relative to the parts illustrated and are not intended to limit the movement of the described parts in any particular direction. For example, if the body frame 10 is mounted on a slanted or vertical surface, the horizontal and vertical orientations will shift relative to an overall directional system, but not relative to each other.

In more detail, the base rotatable part 210 is configured to be rotatably coupled to the body frame 10 and may be composed of a main column 212 connected to a baseplate 211 of the entire structure of the supporting arms 20a, 20b.

The baseplate 211 is a circular member that receives the main column 212 and provides for rotation thereof. A housing 201 is mounted to the body frame 10 and has an opening to receive the baseplate 211. The baseplate is further mounted to the body frame 10 using a shaft (not illustrated) to allow the baseplate 211 to be rotatably fixed to the body frame 10 to move within the housing 201.

The base rotatable part 210 allows the supporting arms 20a and 20b to reach a desired location and support all bumper sizes and shapes. The base rotatable part 210 may horizontally rotate about the body frame 10 in a range of up to about 150°.

The clamp arm rotatable part 220 is coupled to back ends of two cantilevers 241 and 242. Front ends of the cantilevers 241 and 242 are pivotally coupled to a bracket 243 and are configured to extend in the transverse direction at the upper part of a main column 212.

Pivot axes 241a and 242a are provided for the two cantilevers 241 and 242 to rotate relative to the main column 212. The terms front end and back end are used for identification purposes, are interchangeable, and are not meant to limit the structure in any way.

A clamp arm 221 extending in the transverse direction is pivotally coupled to the clamp arm rotatable part 220 so as to rotate horizontally in a circular motion. The clamp arm rotatable part 220 is a second horizontal rotatable part in addition to the base rotatable part 210 and enables the worker to position a clamp assembly 236 in all positions desired to load a bumper.

At one end of the clamp arm 221, the clamp rotatable part 230 is pivotally coupled to rotate the clamp assembly 236 substantially perpendicular to the rotation direction of the clamp arm 221. The clamp rotatable part 230 rotates on a vertical plane along an axis of the clamp arm 221 so that the worker may position a bumper held by the clamp assembly 236 in a punching position which is optimally supported and fixed for each bumper type.

The clamp assembly 236 is adapted to grip a bumper using two gripping pads 233 and 233' included therein. A fixed gripping pad 233 is disposed in a fixed in position. A movable gripping pad 233' is configured to be variable in position so that the spacing between the gripping pads 233 and 233' may be widened and narrowed as desired. Although labeled fixed, the fixed gripping pad 233 may also move position, as described herein.

The fixed gripping pad 233 is fixed by the fixed gripping arm 231 having a substantially L-shape in combination with the clamp rotatable part 230 fixed to the clamp arm rotatable part 220 by way of the clamp arm 221, and a connecting rod 232 connecting the gripping arm 231 and the fixed gripping pad 233. By adjusting the length of the connecting rod 232, the position of the fixed gripping pad 233 may be slightly adjusted if desired.

On the other hand, the movable gripping pad 233' may have a variable spacing in relation to the fixed gripping pad 233 by using a toggle handle 234. To this end, the toggle handle 234, a movable gripping arm 231' moved by the toggle handle 234, and a connecting rod 232' connecting the movable gripping arm 231' and the movable gripping pad 233', are provided.

In addition, there is an air cylinder 240 configured to vertically move the clamp arm rotatable part 220 at the front ends of the cantilevers 241 and 242 to raise and lower the loading position of a bumper. An upper portion of the air cylinder 240 is coupled to the lower cantilever 241 at the pivot axis 241a. The front ends of the two cantilevers 241 and 242 arranged one above the other are pivotally coupled via the bracket 243 to the upper part of the main column 212. The air cylinder 240 is also pivotally coupled to a terminal end of the cantilever 241 beyond the pivot axis 241a. A coupling part 244 is used to couple the air cylinder 240 to the cantilever 241. Using this configuration, the clamp arm rotatable part 220 at back ends of the cantilevers 241, 242 may be lifted and lowered by the action of the air cylinder 240. The air cylinder 240 may adjust a bumper loading weight using a weight high/low regulator. The height may be fixed using a brake mechanism.

In this way, it is possible to set the clamp arm rotatable part 220 to an optimum height for the size of a bumper by using a cylinder and a pneumatic circuit. The height of the clamp arm rotatable part 220 has an adjustable range to accommodate all bumper sizes, shapes, required hole punching positions, etc. According to one embodiment, vertical height adjustment is possible within a range of up to 700 mm.

Further, each of rotatable parts, i.e., the base rotatable part 210, the clamp arm rotatable part 220, and the clamp rotatable part 230, may be regulated in rotation and fixed in position by an air cylinder (not illustrated) dedicated to each of rotatable parts. The lock and unlock of the air cylinder 240 vertically moving the air cylinders of these each of rotatable parts and the clamp arm rotatable part 220 at the back ends of the cantilevers 241 and 242 may be controlled by a lock/unlock switch 250. The air cylinder may be controlled by controlling the air pressure from a compressor (not illustrated) by using the lock/unlock switch 250. After correctly loading and clamping a bumper using the supporting arms 20a and 20b, the worker may lock all the joints to securely fix the bumper in place during the punching process by operating the lock/unlock switch 250. To this end, it is possible to utilize a brake mechanism used in a pneumatic system.

In this way, the air cylinder is fixed to the supporting arms 20a and 20b so that the height and rotation position of the supporting arms 20a and 20b may be easily adjusted and fixed.

FIGS. 3 to 6 illustrate examples of various changes in positions of the supporting arm 20a, 20b.

Figure 3:
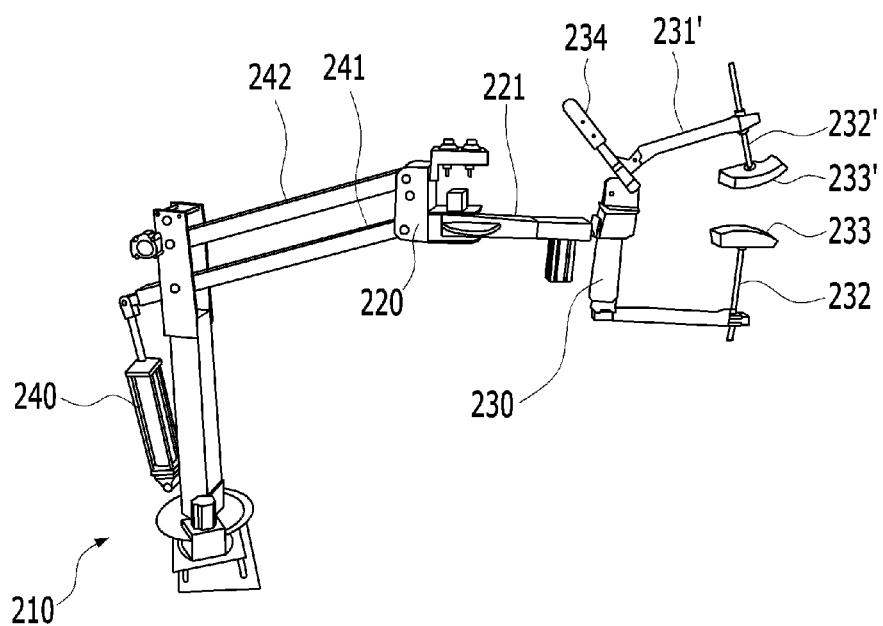
FIGS. 3, 4, 5, and 6 illustrate examples of various changes in positions of the supporting arm.

FIG. 3 illustrates a state in which the base rotatable part 210 is such that the supporting arms 20a, 20b are positioned outward, the clamp arm rotatable part 220 is positioned at a medium height, the clamp arm 221 extends straight, the clamp rotatable part 230 is rotated vertically, and the spacing of the movable gripping pad 233' with respect to the fixed gripping pad 233 is narrowed.

Figure 4:
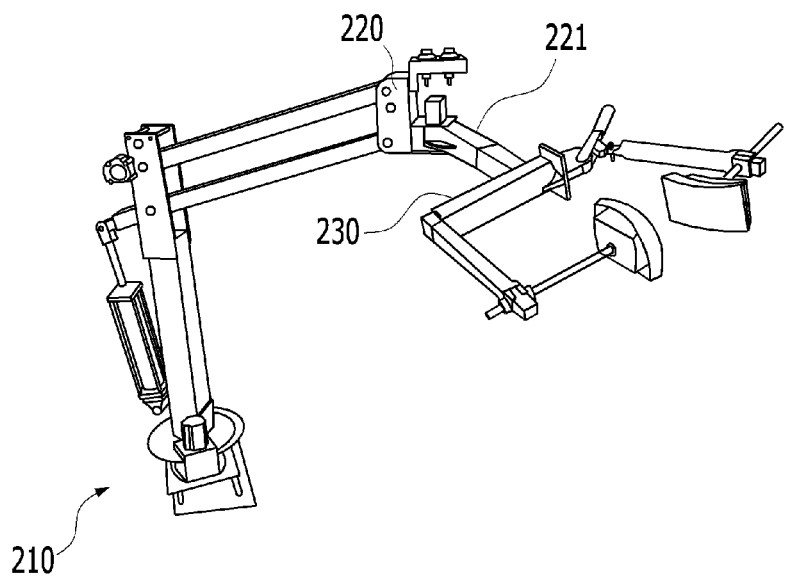

FIG. 4 illustrates a state in which the base rotatable part 210 is such that the supporting arms 20a, 20b are positioned outward, the clamp arm rotatable part 220 is positioned at a medium height, the clamp arm 221 is turned further inward as compared with FIG. 3, the clamp rotatable part 230 is rotated horizontally, and the spacing of the movable gripping pad 233' with respect to the fixed gripping pad 233 is similar to the case in FIG. 3.

Figure 5:
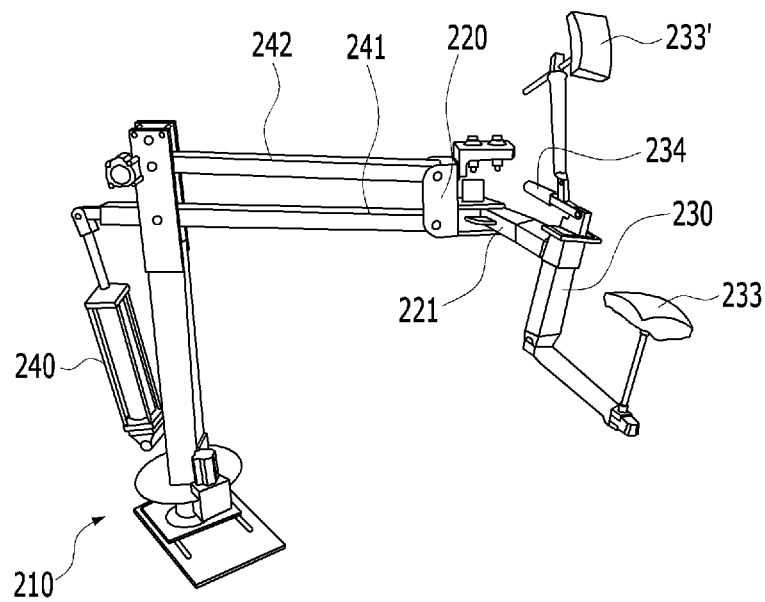

FIG. 5 illustrates a state in which the base rotatable part 210 is such that the supporting arms 20a, 20b are positioned outward similar to FIGS. 3 and 4, the clamp arm rotatable part 220 is positioned downward from a medium height, the clamp arm 221 is turned slightly inward compared to FIG. 4, the clamp rotatable part 230 is rotated vertically, and the spacing of the movable gripping pad 233' with respect to the fixed gripping pad 233 is greatly widened.

Figure 6:
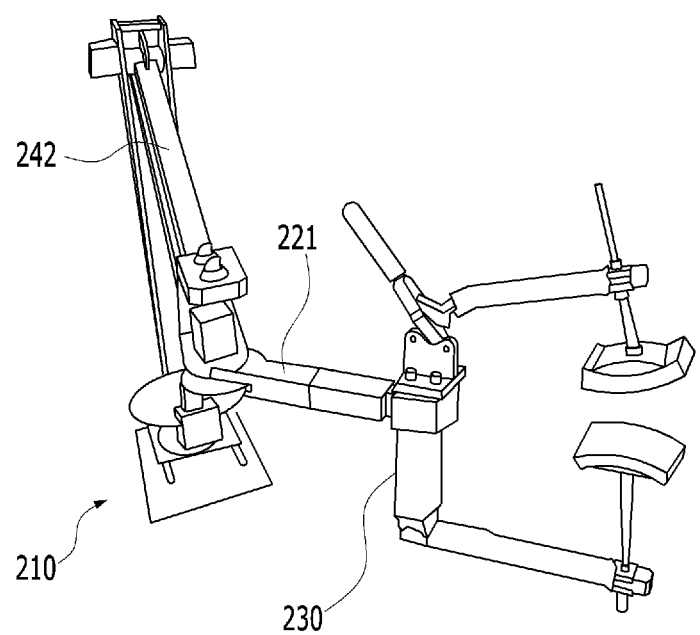

FIG. 6 illustrates a state in which the base rotatable part 210 is rotated by approximately 90° so that the supporting arms 20a, 20b are positioned inward, the clamp arm rotatable part 220 is positioned downward from a medium height, the clamp arm 221 is turned outward as opposed to the cases of FIGS. 4 and 5, the clamp rotatable part 230 is rotated vertically, and the spacing of the movable gripping pad 233' with respect to the fixed gripping pad 233 is narrowed.

Thus, in the punching/welding apparatus of the present invention, the height and horizontal position of the supporting arms 20a, 20b, and the position and spacing of the clamp are freely adjustable, so that it is possible to accommodate any types of bumper models requiring punching and welding.

According to the structure of the supporting arms 20a and 20b described above, although the conventional punching/welding machine configured to manufacture the bumper includes all types of jigs and two human forces are required to support and fix the bumper during the manufacturing process, supporting arms 20a, 20b having a high degree of freedom of the present invention are designed to be freely adjustable in height and horizontal position and to accommodate all types of bumper models requiring punching. It also reduces the manpower requirements of existing manual punching machines from two to one worker. After one worker operates the supporting arms 20a, 20b to load the bumper and fix it in the correct punching position, the worker can move to proceed next process.

Next, a punching head configured to punch the bumper is described. The punching head 30 is positioned at a central part of the body frame 10, and two points of a given bumper may be supported and loaded on one of the pair of supporting arms 20a, 20b and the supporting part of the punching head 30. The punching head 30 is rotatable by 90° in the clockwise/counterclockwise direction in the plane defined by the vertical wall of the body frame 10. Therefore, it is possible to easily perform side or corner punching in order to perforate holes for brackets configured to fix one or more sensors on the side or corner surfaces of the bent portions and both ends as well as the central flat surface of the bumper.

Figure 7:
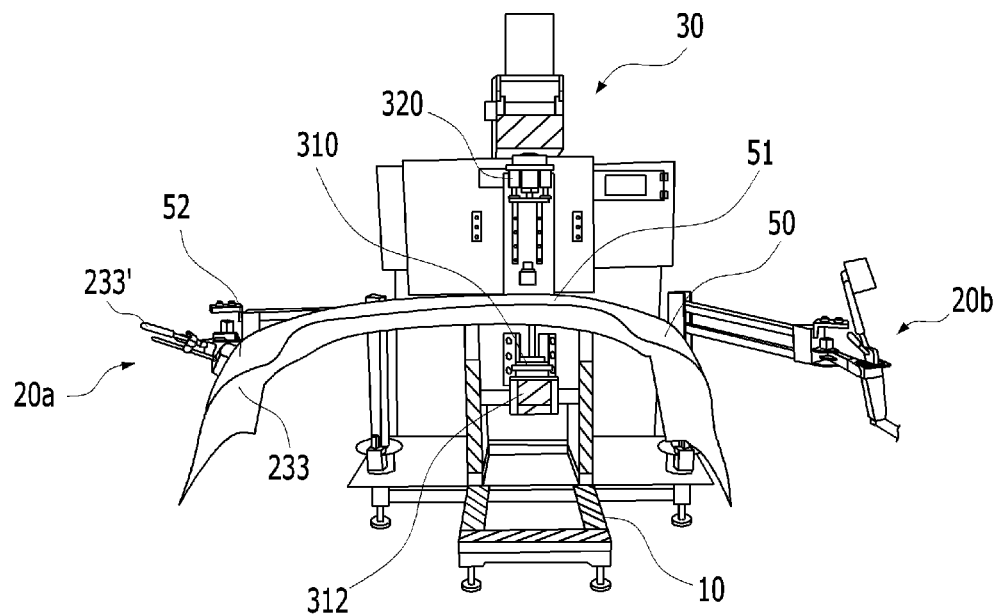
FIG. 7 illustrates a state in which the punching head is vertically erected to perform a punching operation.
Figure 8:
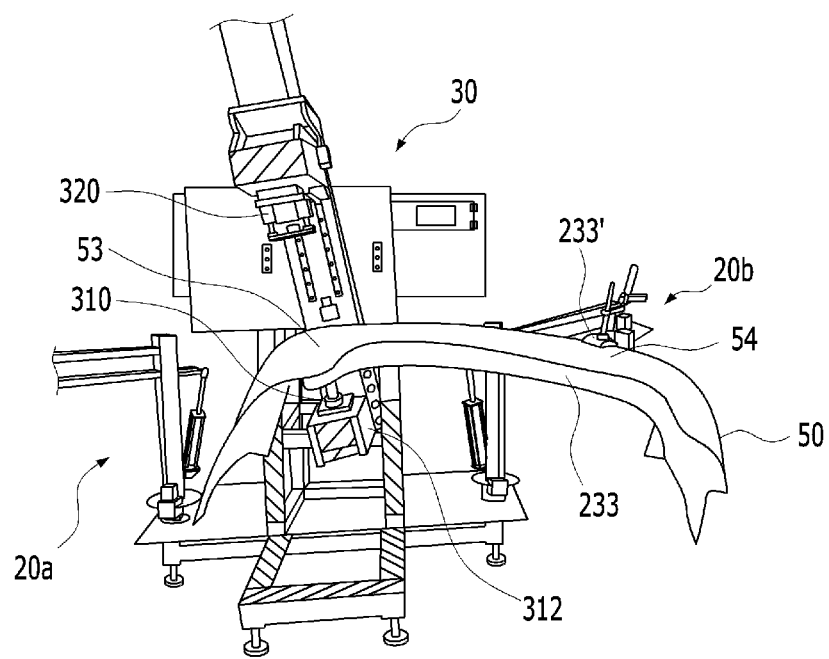
FIG. 8 illustrates a state in which the punching head is rotated counterclockwise to perform a punching operation.

FIG. 7 illustrates a situation in which the punching head 30 is vertically erected to punch at a punching position 51 on a central part of a bumper 50, and FIG. 8 illustrates a situation in which the punching is performed at a punching position 53 at a bent corner portion of the bumper 50 by rotating the punching heads 30 about 20° in the counterclockwise direction.

The punching head 30 includes a bumper loading part 310 connected to at a base part 312 and a punching part 320 at an upper portion thereof. The bumper 50 is two-point supported and loaded in a horizontal position by one of the aforementioned pair of supporting arms 20a, 20b and the bumper loading part 310, and the punching part 320 is lowered to the loaded bumper and punching process is performed at the punching position thereof. In other embodiments, the both supporting arms 20a and 20b, as well as the bumper loading part 310 may be used for three-point support when punching or welding a bumper.

In FIG. 7, it can be noted that the punching head 30 is vertically erected in order to perform punching. The punching position 51 on the central part of the bumper 50 and the bumper 50 is supported and loaded by the left-side supporting arm 20a and the bumper loading part 310 of the punching head 30. That is, a left corner fixing point 52 of the bumper 50 is gripped by the fixed gripping pad 233 and the movable gripping pad 233' of the left-side supporting arm 20a, and the punching position 51 on the center part of the bumper 50 is supported by the bumper loading part 310. At this time, the right-side supporting arm 20b rests (or puts on standby).

In FIG. 8, it can be noted that the punching head 30 is rotated about 20° in the counterclockwise direction in order to perform punching at the left corner bent portion punching position 53 of the bumper 50 and the bumper 50 is supported and loaded by the right-side supporting arm 20b and a bumper loading part 310 of the punching head 30. That is, the punching position 53 on the left corner bent portion of the bumper 50 is supported by the bumper loading part 310, and a fixing point 54 on the right portion of the center part of the bumper 50 is gripped by the fixed gripping pad 233 and the movable gripping pad 233' of the right-side supporting arm 20b. At this time, the left-side supporting arm 20a rests (or puts on standby).

Because the conventional punching machines did not include any jigs, the worker had to hold the bumper during the process and so there was a safety problem. In addition, when punching a hole in a non-horizontal surface such as the side or corner portion of a bumper or a bent part, the worker may turn the bumper and hold it to the side. For this reason, depending on the size and shape of the bumper, a portion of the bumper may reach the floor and be damaged. However, by configuring the punching head 30 to rotate 90° in both directions with respect to the body frame 10 as in the present invention, it is possible to load the bumper so that the bumper 50 does not reach the floor, and to perform punching at any position while the bumper is kept in a horizontally loaded state (see FIG. 8), and it is also possible to make the load/unload of the bumper simpler and easier for the worker.

The welding part 40 will be described. The welding part 40 is a component for welding (e.g., ultrasonic welding) the accessories (brackets, holders, etc.) for sensor installation to the punched bumper. The welding part 40 of the manual universal punching/welding apparatus of the present invention is the ultrasonic welding equipment. A characteristic part of the configuration of the invention ultrasonic welding equipment will be described.

Because ultrasonic welding is performed manually by a worker, human error occurs in a large amount and which is a high area for concern in the industry. According to the conventional manual welding, the worker has to position the welding tip vertically on the surface of the object to be welded, which may be difficult, and so it takes an excessive welding time, causing the problem in that the sensor holder or the bumper is easily burnt, so that the welding part after welding is uneven and that defect may occur in the bumper. These problems are also latent in the manual universal punching/welding apparatus of the present invention.

The manual universal punching/welding apparatus of the present invention provides a welder guide to allow the worker to easily adjust the depth and angle of the ultrasonic welding to consistently perform good quality welding in order to respond to such worker's defects.

Figure 9:
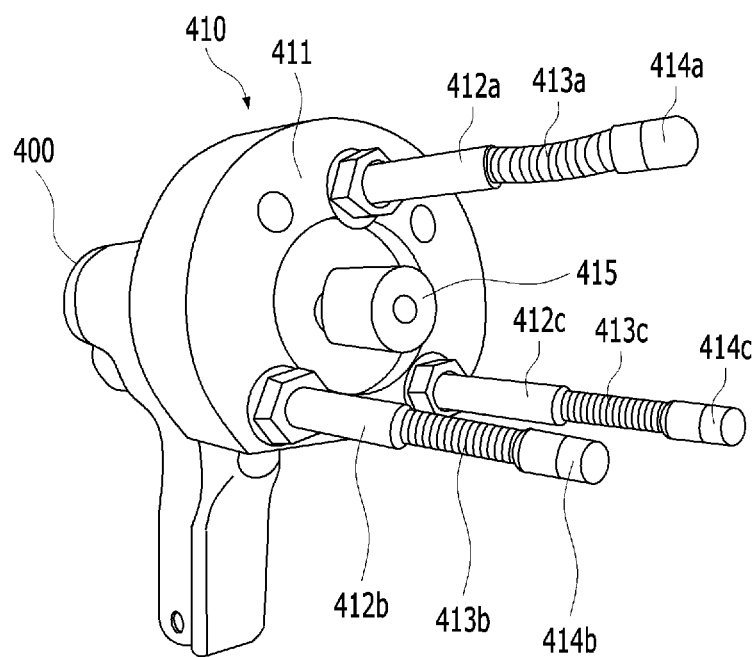
FIG. 9 illustrates a welder guide coupled to a welder of the welding part.

FIG. 9 illustrates a welder 400 and a welder guide 410 among the components of the welding part 40. The welder guide 410 includes a disk 411 coupled to the welder 400 and three prongs 412a, 412b, 412c attached to protrude from the disk 411 axially toward the object to be welded. End caps 414a, 414b, 414c are covered at the ends of each prong 412a, 412b, 412c. In addition, springs 413a, 413b, 413c are inserted in each of the prongs 412a, 412b, 412c from each of the end caps 414a, 414b, 414c to each of the medium parts of the prongs. Each spring 413a, 413b, 413c is independently elastic. At the center of the disk 411 there is a welding tip hole 415 to which an ultrasonic welding tip (not illustrated) is coupled.

It is important to design the lengths of the prongs 412a, 412b, 412c. When a worker uses the welder 400 to perform ultrasonic welding, he/she places the welder guide 410 on the object to be welded (thereby three prongs 412a, 412b, 412c are in contact around the welding position). Therefore, it should be designed with a perfect length that ensures consistent welding depth when applying force to the welder 400 and prevents welding burns or spots at the bumper welding position. In addition, the springs 413a, 413b, 413c absorb unevenness in the welding plane so that the ultrasonic welding may always be performed vertically.

Figure 10:
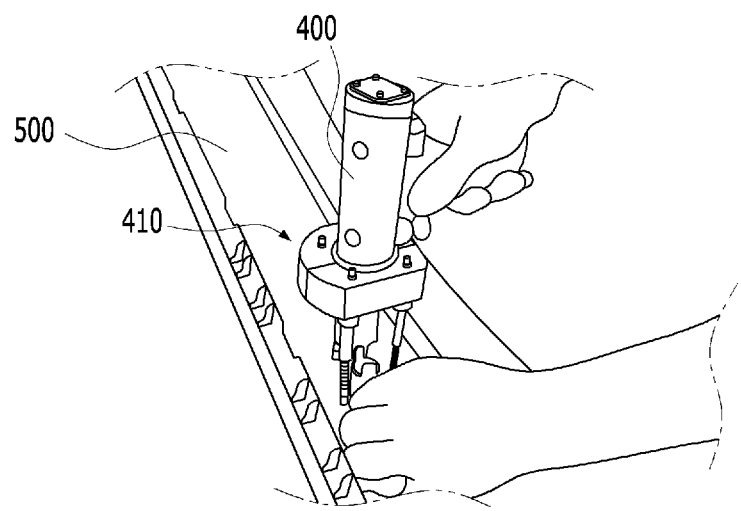
FIG. 10 illustrates a scene in which ultrasonic welding is performed on a bumper using the welder equipped with the welder guide.

FIG. 10 illustrates a scene in which ultrasonic welding is performed on a bumper using the welder 400 equipped with the welder guide 410 configured as described above. The worker holds the welder 400 and contacts the end caps 414a, 414b, 414c of the three prongs 412a, 412b, 412c of the welder guide 410 to the welding surface of the bumper 50 and applies pressure to the welder 400.

Because the welder guide 410 always has a 3-pronged attachment that ensures manual welding vertically, vertical welding is possible and thus consistent and uniform ultrasonic welding can be achieved. The welder guide 410 also constantly limits the welding depth to prevent the welding surface of the bumper from being burnt.

Until now, although the present invention has been described in detail through preferred embodiments of the present invention, those of ordinary skill in the art to which the present invention pertains will appreciate that the present invention may be implemented in a specific form different from the contents disclosed herein without altering the technical spirit or essential features thereof.

As such, it should be understood that the embodiments described above are illustrative in all respects and not limiting. In addition, the scope of protection of the present invention is determined by the claims described later rather than the above detailed description, and all alteration or modified forms derived from the scope of the claims and their equivalent concepts should be construed as being included in the technical scope of the present invention.

What is claimed is:

1. A manual universal punching and welding apparatus configured to punch and weld a work object, comprising:
    a flat body frame having at least a vertical wall;
    a pair of supporting arms that are each attached to the flat body frame via respective housings and baseplates at a first side of the flat body frame and at a second side two sides of the flat body frame, and are configured to clamp a portion of the work object, wherein each supporting arm includes a plurality of joints configured to rotate the clamped work object in different directions, and a vertical moving part configured to raise and lower the clamped work object;
    a punching head configured to rotate clockwise and counterclockwise in a plane defined by the vertical wall of the body frame, wherein the punching head includes a work object loading part that supports and loads the work object together with one of the pair of supporting arms and a punching part configured to punch on the loaded work object; and
    a welding part configured to weld the work object loaded on the work object loading part of the punching head.

2. The manual universal punching and welding apparatus of claim 1, wherein the joint of the supporting arm comprises:
    a base rotatable part rotatably coupled to the body frame and configured to horizontally rotate the supporting arm;
    a clamp arm rotatable part pivotally coupled to an upper part of the base rotatable part configured to horizontally rotate a clamp arm coupled to an end of a cantilever extending in a transverse direction; and
    a clamp rotatable part pivotally coupled to the end of the clamp arm to rotate a clamp assembly holding the work object so as to be substantially perpendicular to a rotation direction of the clamp arm.

3. The manual universal punching and welding apparatus of claim 2, wherein the clamp assembly comprises:
    two gripping pads configured to grip the work object, wherein one of the two gripping pads being fixed in position and the other being configured to be variable in position, so that the spacing between the two gripping pads is adjusted.

4. The manual universal punching and welding apparatus of claim 2, wherein the clamp assembly comprises:
    a fixed gripping pad fixedly connected to a fixed gripping arm connected to the clamp arm rotatable part, via a first connecting rod; and
    a movable gripping pad connected to the clamp arm rotatable part and having a variable spacing with the fixed gripping pad by a toggle handle,
    wherein the movable gripping pad is movably connected to the movable gripping arm that is moved by the toggle handle, via a second connecting rod.

5. The manual universal punching and welding apparatus of claim 1, wherein the vertical moving part of the work object comprises:
    an air cylinder configured to raise and lower the clamped work object.

6. The manual universal punching and welding apparatus of claim 5, further comprising:
    a lock/unlock switch configured to control locking and unlocking of the air cylinder.

7. The manual universal punching and welding apparatus of claim 1, wherein the plurality of joints of the supporting arm are fixed in rotational position by a first brake mechanism, and the vertical moving part of the supporting arm is fixed in a vertical movement position by a second brake mechanism.

8. The manual universal punching and welding apparatus of claim 1, wherein the plurality of joints of the supporting arm are restricted in rotation and fixed in position, by an air cylinder dedicated to each joint.

9. The manual universal punching and welding apparatus of claim 8, further comprising:
    a lock/unlock switch configured to control locking and unlocking of the air cylinder.

10. The manual universal punching and welding apparatus of claim 1, wherein when the work object is configured to be supported and loaded by a first supporting arm of the pair of supporting arms and the work object loading part of the punching head, a second supporting arm of the pair of supporting arms rests.

11. The manual universal punching and welding apparatus of claim 1, wherein the welding part is an ultrasonic welder.

12. The manual universal punching and welding apparatus of claim 1, wherein the welding part comprises:
    a welder; and
    a welder guide including a disk coupled to the welder, and a plurality of prongs attached to protrude toward the object to be welded in an axial direction from the disk,
    wherein the plurality of prongs contact to the work object when the work object is welded by the welder.

13. The manual universal punching and welding apparatus of claim 12, wherein the welder guide comprises:
    an end cap covered at the end of each prong of the plurality of prongs; and
    a spring inserted from the end cap to middle part of each prong,
    wherein each of the springs has an elastic action independently of the other.

14. A manual universal punching and welding apparatus configured to punch and weld a work object, comprising:
    a body frame having at least a vertical wall;

a pair of supporting arms that are attached to the body frame and clamp a portion of the work object, wherein each supporting arm includes a plurality of joints configured to rotate the clamped work object in different directions, and a vertical moving part configured to raise and lower the clamped work object;

a punching head configured to rotate clockwise and counterclockwise in a plane defined by the vertical wall of the body frame, wherein the punching head includes a work object loading part that supports and loads the work object together with one of the pair of supporting arms and a punching part configured to punch on the loaded work object; and a welding part configured to weld the work object loaded on the work object loading part of the punching head, wherein the joint of the supporting arm comprises:

a base rotatable part rotatably coupled to the body frame and configured to horizontally rotate the supporting arm;

a clamp arm rotatable part pivotally coupled to an upper part of the base rotatable part configured to horizontally rotate a clamp arm coupled to an end of a cantilever extending in a transverse direction; and a clamp rotatable part pivotally coupled to the end of the clamp arm to rotate a clamp assembly holding the work object so as to be substantially perpendicular to a rotation direction of the clamp arm.

15. A manual universal punching and welding apparatus configured to punch and weld a work object, comprising:

a body frame having at least a vertical wall;

a pair of supporting arms that are attached to the body frame and clamp a portion of the work object, wherein each supporting arm includes a plurality of joints configured to rotate the clamped work object in different directions, and a vertical moving part configured to raise and lower the clamped work object;

a punching head configured to rotate clockwise and counterclockwise in a plane defined by the vertical wall of the body frame, wherein the punching head includes a work object loading part that supports and loads the work object together with one of the pair of supporting arms and a punching part configured to punch on the loaded work object; and a welding part configured to weld the work object loaded on the work object loading part of the punching head;

wherein the welding part comprises:

a welder; and a welder guide including a disk coupled to the welder, and a plurality of prongs attached to protrude toward the object to be welded in an axial direction from the disk, wherein the plurality of prongs contact to the work object when the work object is welded by the welder, wherein the welder guide comprises:

an end cap covered at the end of each prong of the plurality of prongs; and a spring inserted from the end cap to middle part of each prong, wherein each of the springs has an elastic action independently of the other.

* * * * *